United States Patent
Hua et al.

(10) Patent No.: US 8,659,919 B2
(45) Date of Patent: Feb. 25, 2014

(54) CIRCUIT TO IMPROVE LIGHT LOAD POWER FACTOR OF POWER SUPPLY

(75) Inventors: Guichao Hua, Zhejiang (CN); Xiaoli Yao, Zhejiang (CN); Liangan Ge, Zhejiang (CN); Lijun Ren, Zhejiang (CN)

(73) Assignee: Inventronics (Hangzhou), Inc., Hangzhou (CN)

( * ) Notice: Subject to any disclaimer, the term of this patent is extended or adjusted under 35 U.S.C. 154(b) by 515 days.

(21) Appl. No.: 12/896,259

(22) Filed: Oct. 1, 2010

(65) Prior Publication Data
US 2011/0080144 A1    Apr. 7, 2011

(30) Foreign Application Priority Data
Oct. 1, 2009  (CN) .......................... 2009 1 0153406

(51) Int. Cl.
*H02M 1/14*   (2006.01)
*H02M 1/42*   (2007.01)

(52) U.S. Cl.
USPC ................ 363/45; 363/81; 323/266; 323/282

(58) Field of Classification Search
USPC ........... 363/44–48, 81–91; 323/266, 282–286
See application file for complete search history.

(56) References Cited

U.S. PATENT DOCUMENTS

| | | | | |
|---|---|---|---|---|
| 3,987,356 | A * | 10/1976 | Steigerwald | 363/44 |
| 5,155,430 | A * | 10/1992 | Gulczynski | 323/224 |
| 5,402,331 | A * | 3/1995 | Takahashi et al. | 363/89 |
| 6,194,885 | B1 * | 2/2001 | Oshima | 323/285 |
| 6,339,262 | B1 * | 1/2002 | Igarashi et al. | 307/39 |
| 7,176,660 | B2 * | 2/2007 | Usui et al. | 323/207 |
| 2002/0067624 | A1 * | 6/2002 | Nishiyama et al. | 363/21.01 |
| 2009/0135628 | A1 * | 5/2009 | Ye et al. | 363/21.04 |
| 2011/0080102 | A1 * | 4/2011 | Ge et al. | 315/200 R |

* cited by examiner

*Primary Examiner* — Jessica Han
(74) *Attorney, Agent, or Firm* — Terry M. Sanks, Esq.; Beusse Wolter Sanks Mora & Maire, P.A.

(57) ABSTRACT

A circuit to improve the power factor of a power supply at light load, the circuit including a rectifier bridge, a filter positioned before or after the rectifier bridge, a logic control and power drive circuit, a switching transistor, a light load detecting circuit configured to output a control signal to the logic control and power drive circuit which controls the switching transistor to conduct when a heavy load is experienced and to cut off when a light load is experienced, in order to control the working status of the filter capacitor, and a power factor correction circuit.

2 Claims, 7 Drawing Sheets

CIRCUIT TO IMPROVE LIGHT LOAD POWER FACTOR OF POWER SUPPLY

CROSS-REFERENCE TO RELATED APPLICATIONS

This application claims priority to Chinese Patent Application No. 200910153406.2 filed Oct. 1, 2009, which is incorporated herein by reference.

BACKGROUND OF THE INVENTION

The present invention generally relates to a novel circuit which can improve the power factor of a power supply when experiencing a light load. Specifically, it relates to a circuit which can achieve a higher power factor even in a light load condition.

In order to reduce the harm caused by harmonics and reactive power, power factor correction technique is widely used in power electronics equipments. A majority of the power factor correction (PFC) circuits can achieve higher power factor (PF) value in heavy load condition, but when the load reduces, the PF value will also decrease accordingly. Normally, for power factor correction circuits which are suitable for a wide input voltage range, the PF value decreases more drastically when the load reduces in the high input voltage terminal. Currently, electrical equipment with higher PF value is required in more occasions in which there is a wide load range. Therefore, techniques required to improve light load power factor for power supply are becoming important.

BRIEF DESCRIPTION OF THE INVENTION

The present invention intends to solve the problems mentioned above which are related to the existing power factor correction circuits, and to provide a circuit which can provide higher PF value with light load. Towards this end, a circuit to improve the power factor of a power supply at light load is disclosed. The circuit comprises a rectifier bridge, a filter positioned before or after the rectifier bridge, a logic control and power drive circuit, a switching transistor, a light load detecting circuit configured to output a control signal to the logic control and power drive circuit which controls the switching transistor to conduct when a heavy load is experienced and to cut off when a light load is experienced, in order to control the working status of the filter capacitor, and a power factor correction circuit.

BRIEF DESCRIPTION OF THE DRAWINGS

A more particular description of the invention briefly described above will be rendered by reference to specific embodiments thereof that are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF THE INVENTION

Figure 1:
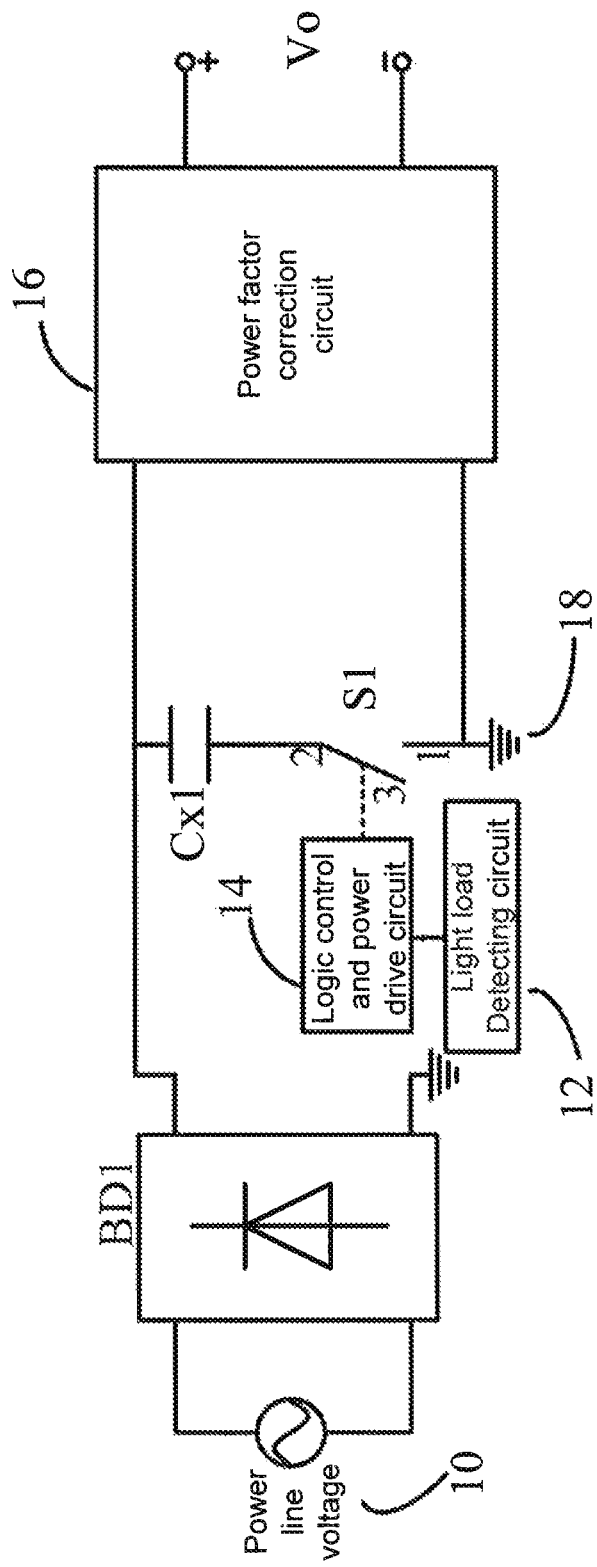
FIG. 1 is a circuit which will improve light load power factor of power supply as applied in scheme (1) of the present invention.

In general, the problem mentioned above can be resolved with a filter capacitor at the input AC-side which can generate capacitive current which causes a phase difference between input voltage and input current, thus the PF value is reduced. A filter capacitor at the DC side of the rectifier bridge is able to generate capacitive current, and it can also increase the current zero-crossing distortion of the PFC circuit, thus the PF value decreases.

The following technical methods are adopted to solve the problem mentioned above. Generally, a circuit which can improve the power factor of a power supply at light load is provided. It comprises a filter, a light load detecting circuit, a logic control and power drive circuit, a switching transistor, a rectifier bridge and a power factor correction circuit. Exemplary embodiments of the present invention have the following features: the filter can be placed before or after the rectifier bridge and it contains at least one filter capacitor. The light load detecting circuit outputs a control signal to the logic control and power drive circuit which controls the switching transistor to conduct at heavy load and to cut off at light load, thus, controlling the working status of the filter capacitor.

More specifically, there are three optimal schemes:

(1) Reduce the filter capacitor at the DC side of the rectifier bridge when the power supply is operated in a light load condition ("Scheme (1)");

(2) When the rectifier bridge is followed by a π-shaped filter and a boost power factor correction circuit, cut out the last stage filter capacitor of the π-shaped filter in light load ("Scheme (2)"); and (3) Reduce the filter capacitor at L and N lines in light load ("Scheme (3)").

The circuit that can improve light load power factor of power supply, as suggested in scheme (1) comprises a capacitor, a light load detecting circuit, a switching transistor, a logic control and a power drive circuit, a rectifier bridge and a power factor correction circuit. This circuit has the following features: the input terminals of the rectifier bridge are connected with the power line voltage, while the output of terminals of the rectifier bridge are connected in parallel with the power factor correction circuit and a branch circuit in which a capacitor and the switching transistor are connected in series. The output of the light load detecting circuit is connected with the input of the logic control and power drive circuit, and the output of the logic control and power drive circuit is connected with the third terminal of the switching transistor.

In scheme (1), when the power supply is working in heavy load condition, the light load detecting circuit outputs control signal to logic control and power drive circuit which control the switching transistor to conduct; when the power supply is working in light load condition, the light load detecting circuit outputs control signal to logic control and power drive circuit which control the switching transistor to cut off.

In scheme (1), the capacitor at the rectifier bridge' DC-side is worked as filter capacitor in heavy load, but will be cut off by switching resistor in light load. The phase difference between input voltage and current in light load input is decreased, and so do the current zero-crossing distortion, thus the PF value is improved.

The circuit that can improve the power factor of a power supply at light load, as mentioned in scheme (2), comprises a rectifier bridge, a first capacitor, a second capacitor, an inductor, a switching transistor, a logic control and power drive circuit, a light load detecting circuit and a power factor correction circuit. This circuit has the following features: the two terminals of the power line voltage is connected with the input terminal of the rectifier bridge, while the positive output of the rectifier bridge is connected with one terminal of the inductor and one terminal of the first capacitor. The other terminal of the inductor is connected with one terminal of the second capacitor and the positive input terminal of the power factor correction circuit, while the negative input terminal of the power factor correction circuit is connected to the ground. The other terminal of the second capacitor is connected with the second terminal of the switching transistor, while the first terminal of the switching transistor is connected to the ground. The output terminal of the light load detecting circuit is connected with the input terminal of the logic control and power drive circuit, and the output of the logic control and power drive circuit is connected with the third terminal of the switching transistor.

In scheme (2), when the power supply is working in a heavy load condition, the light load detecting circuit outputs the control signal to logic control and power drive circuit which signal the switching transistor (S1) to conduct, capacitor Cx1, inductor L1 and capacitor Cx2 form π-shaped filter; when the power supply is working in a light load condition, the light load detecting circuit outputs the control signal to logic control and power drive circuit which signal the switching transistor (S1) to cut off, and thus capacitor Cx2 is opened, inductor L1 and inductor L2 are connected in series, and work as a part of the energy inductor in Boost power factor correction circuit.

In scheme (2), the capacitor and inductor at the DC-side of the rectifier bridges working as a π-shaped filter in heavy load. While in light load, the last stage filter capacitor of the π-shaped filter is cut off by switching resistor, decreasing the phase difference between input voltage and the current zero-crossing distortion, and thus the PF value can be improved. Meanwhile, when the capacitor is cut off from the circuit, the inductor of the π-shaped filter is connected in series with the energy inductor of the followed Boost PFC circuit, increasing the energy inductance of Boost PFC circuit, but decreasing the current zero-crossing distortion, and thus the PF value of the power supply can be further improved. Therefore, when compared with scheme (1), scheme (2) can improve light load power factor of power supply more effectively.

The circuit that can improve light load power factor of power supply, as suggested in scheme (3), comprises a rectifier bridge (BD1), a capacitor (Cx1), a switching transistor (S1), a logic control and power drive circuit, a light load detecting circuit and a power factor correction circuit. This circuit has the following features: the filter is a capacitor (Cx1), which is connected in series with a switching transistor (S1) and constitute a series loop, then the two terminals of the series loop are connected parallel to the power line, and also to the rectifier bridge, the output terminals of the rectifier bridge are connected with the power factor correction circuit, and the output terminal of the light load detecting circuit is connected to the input of the logic control and power drive circuit, while the output of the logic control and power drive circuit is connected with the third terminal of the switching transistor.

In scheme (3), when the power supply is working in a heavy load condition, the light load detecting circuit outputs the control signal to logic control and power drive circuit which signals the switching transistor S1 to conduct; when the power supply is working in a light load condition, the light load detecting circuit outputs the control signal to logic control and power drive circuit which signals the switching transistor S1 to cut off.

In scheme (3), the filter capacitor at AC input side is cut off by switching resistor in light load decreasing the phase difference between input voltage and current, and thus improving the PF value at a light load power supply.

The light load detecting circuit in the present invention comprises of the detection of input power, and/or detection of output power, and/or detection of any signals which controlling the output power.

Turning to the figures, FIG. 1 is an implementation of the circuit disclosed with respect to scheme (1) which can improve light load power factor of a power supply. The circuit comprises a power line voltage, a capacitor Cx1, a light load detecting circuit 12, a switching transistor (S1), a logic control and a power drive circuit 14, a rectifier bridge DB1 and a power factor correction circuit 16. This circuit has the following features: the input terminal of the rectifier bridge BD1 is connected to the power line voltage 10, the capacitor Cx1 and the switching transistor (S1) are connected in series, which are connected in parallel with an output terminal of the rectifier bridge BD1 and the power factor correction circuit 16, Vo act as output voltage of the power factor correction circuit 16. The output of the light load detecting circuit 12 is connected to the input of the logic control and power drive circuit 14, while the output of the logic control and power drive circuit 14 is connected to the third terminal of the switching transistor S1.

Figure 2:
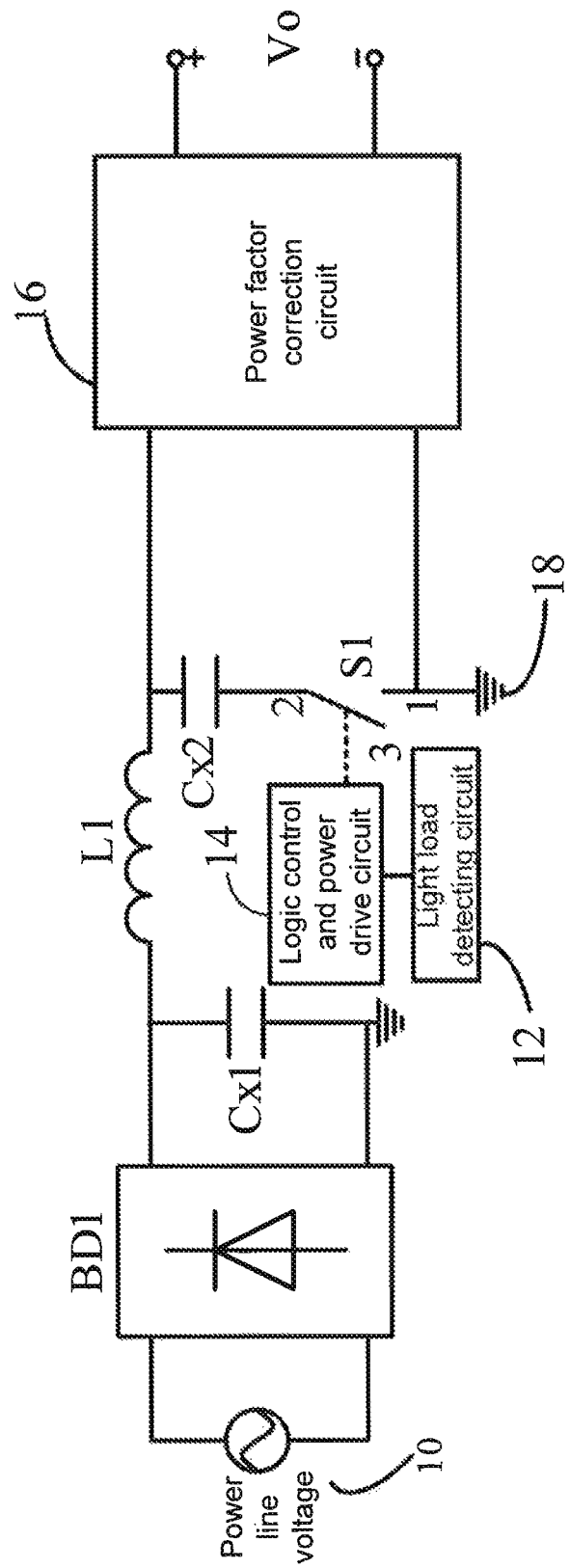
FIG. 2 is a schematic circuit that can improve light load power factor of power supply based on scheme (2) of the present invention.

FIG. 2 is the implementation of a circuit suggested in scheme (2) which can improve light load power factor of power supply. This circuit comprises a power line voltage 10, a rectifier bridge BD1, a first capacitor Cx1, a second capacitor Cx2, an inductor L1, a switching transistor S1, a logic control and a power drive circuit 14, a light load detecting circuit 12, and a power factor correction circuit 16. This circuit has the following features: the power line voltage 10 is connected to the input terminal of the rectifier bridge BD1, the positive output of the rectifier bridge BD1 is connected to one terminal of the inductor L1 and one terminal of the first capacitor Cx1, while the another terminal of the inductor L1 is connected to one terminal of the second capacitor Cx2 and the positive input of the power factor correction circuit 16. The negative input of the power factor correction circuit 16 is connected to ground 18, the other terminal of the second capacitor Cx2 is connected to the second terminal 2 of the switching transistor (S1). While the first terminal 1 of the switching transistor (S1) is connected to the ground 18, the output of the light load detecting circuit 12 is connected to the input of the logic control and power drive circuit 14, the output of the logic control and power drive circuit 14 is connected to the third terminal 3 of the switching transistor (S1). Vo is the output voltage of the power factor correction circuit 16.

Figure 3:
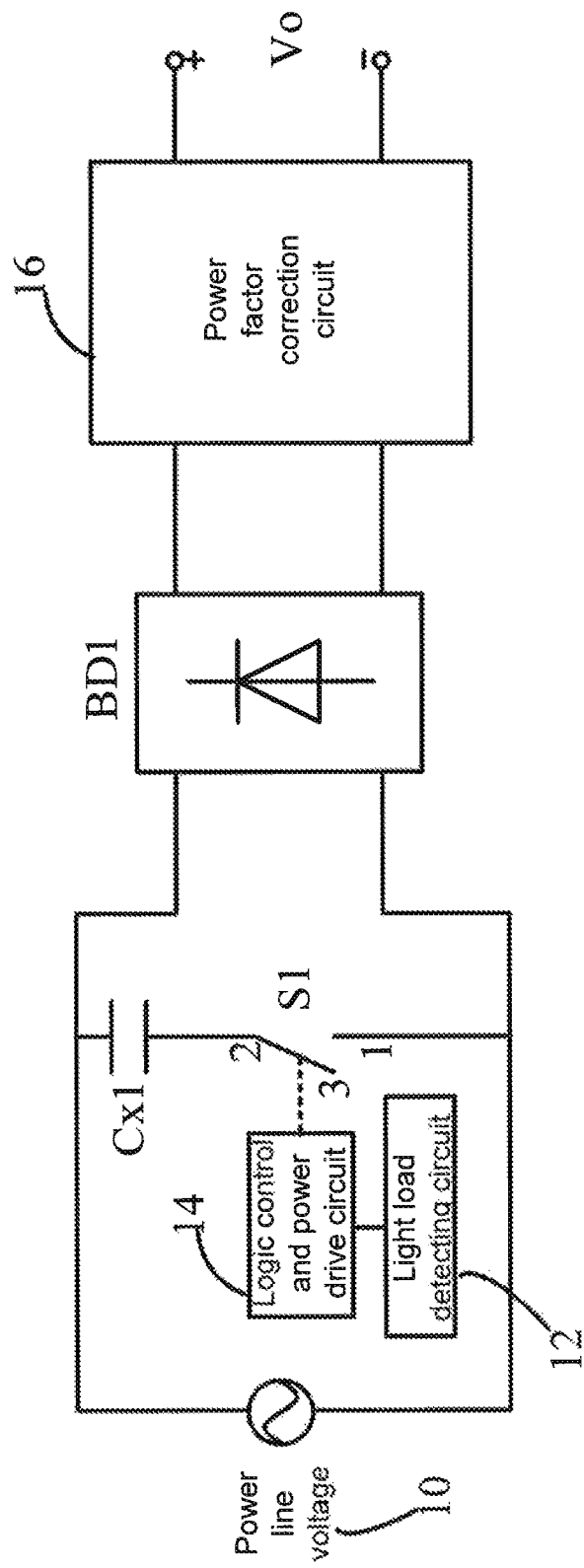
FIG. 3 is a schematic circuit that can improve light load power factor of power supply as suggested in scheme (3) of the present invention.

FIG. 3 is the implementation of a circuit as described in scheme (3) which can improve light load power factor of power supply. This circuit comprises a power line voltage 10, a capacitor Cx1, a switching transistor (S1), a rectifier bridge BD1□a logic control and a power drive circuit 14, a light load detecting circuit 12 and a power factor correction circuit 16. This circuit has the following features: the filter capacitor Cx1 is connected in a series with the switching transistor □S1□, then they are connected in parallel with the power line voltage 10 and followed by the rectifier bridge BD1, the output of the rectifier bridge BD1 is connected to the power factor correction circuit 16. Vo is the output voltage of the power factor correction circuit. The output of the light load detecting circuit 12 is connected to the input of the logic control and power drive circuit 14, and the output of the logic control and power drive circuit 14 is connected to the third terminal 3 of the switching transistor S1.

Figure 4:
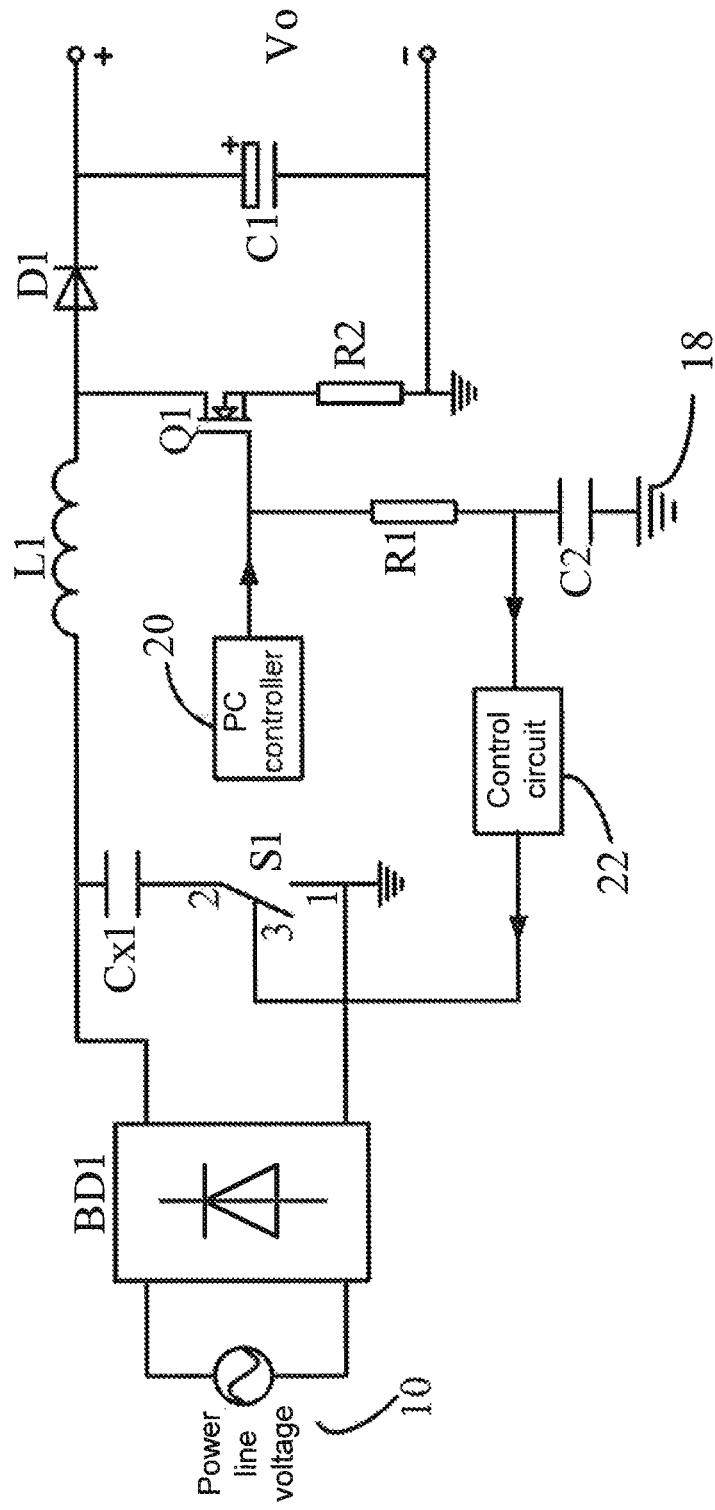
FIG. 4 is a schematic circuit of the first implementation which can improve light load power factor of power supply in scheme (1) of the present invention.

FIG. 4 is a detailed implementation of the circuit which can improve light load power factor of power supply as described in scheme (1). As illustrated, the power factor correction circuit 16 comprises an inductor L1, a MOSFET Q1, a diode D1, an electrolytic capacitor C1, a resistors R1 and R2, a second capacitor C2 and a PFC controller 20. The logic control and power drive circuit 14 together with the light load detecting circuit 12 are combined into a control circuit 22. Specifically, the power line voltage 10 is connected to the input terminal of rectifier bridge BD1, the positive output of the rectifier bridge BD1 is connected to one terminal of inductor L1 and one terminal of capacitor Cx1, the negative output of the rectifier bridge BD1 is connected to the ground 18, the other terminal of capacitor Cx1 is connected to the second terminal 2 of switching transistor (S1), the first terminal 1 of switching transistor (S1) is connected to the ground 18, the other terminal of inductor L1 is connected with the drain of MOSFET Q1 and the anode of diode D1, the source of MOSFET Q1 is connected to one terminal of resistor R2, and the another terminal of R2 is connected to the ground 18. The output of the PFC controller 20 is connected to the gate of MOSFET Q1 and one terminal of resistor R1, the another terminal of resistor R1 is connected to one terminal of the second capacitor C2 and the input terminal of the control circuit 22, and the output terminal of the control circuit 22 is connected with the third terminal 3 of switching transistor (S1). The cathode of diode D1 is connected to the positive terminal of electrolytic capacitor C1, the negative terminal of electrolytic capacitor C1 is connected to the ground 18, and the voltage of the electrolytic capacitor C1 is the output voltage Vo.

As for FIG. 4, the signals driven by gate of MOSFET Q1 are sampled and filtered by resistor R1 and second capacitor C2 into voltage signals, received by the control circuit 22 and output control signals to the third terminal 3 of switching resistor (S1) in order to control the switching action of S1. When the circuit is operated in heavy load condition, the control circuit 22 processes voltage signals produced by resistor R1 and second capacitor C2, and output high level signals causing switching transistor to conduct, then capacitor Cx1 is worked as a filter capacitor. When the circuit is operated in a light load condition, the control circuit 22 processes voltage signals produced by resistor R1 and second capacitor C2, and output low level signals causing switching transistor to cut off, then when capacitor Cx1 is bypassed and light load power factor can be improved.

Figure 5:
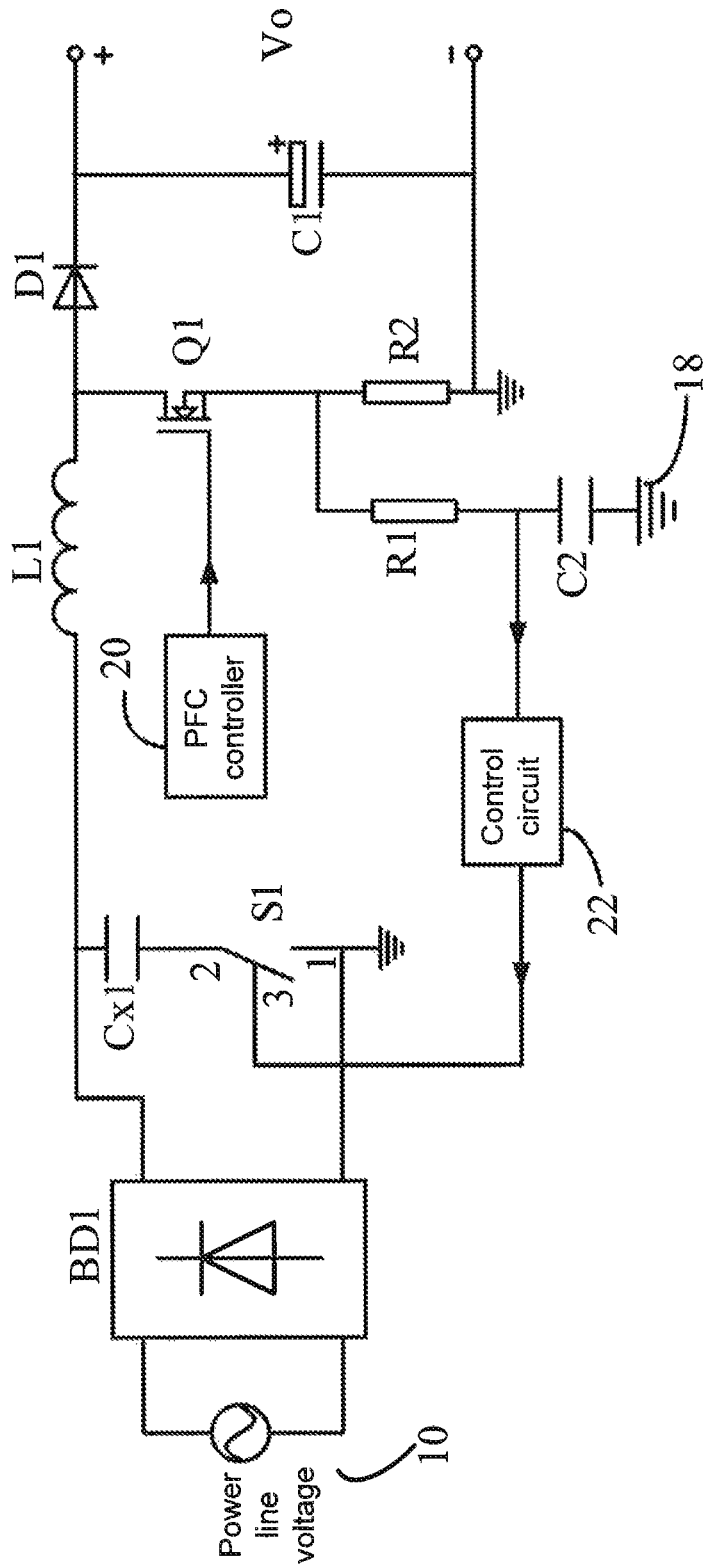
FIG. 5 is a schematic circuit of the second implementation which will improve light load power factor of power supply as in scheme (2) of the present invention.

FIG. 5 is another exemplary implementation of the circuit in details which can improve light load power factor of power supply described in scheme (1). The power factor correction circuit comprises an inductor L1, a MOSFET Q1, a diode D1, an electrolytic capacitor C1, a resistors R1 and R2, a second capacitor C2, and PFC controller 20. The logic control and power drive circuit 14 together with the light load detecting circuit 12 are combined into the control circuit 22. Specifically, the power line voltage 10 is connected to the input terminal of rectifier bridge BD1, the positive output of rectifier bridge BD1 is connected to one terminal of inductor L1 and one terminal of capacitor Cx1, while the negative output of rectifier bridge BD1 is connected to the ground 18, the other terminal of capacitor Cx1 is connected to the second terminal 2 of switching transistor (S1), and the first terminal 1 of switching transistor (S1) is connected to the ground 18. Another terminal of inductor L1 is connected to the drain of MOSFET Q1 and the anode of diode D1, the source of MOSFET Q1 is connected to one terminal of resistor R2 and one terminal of resistor R1, the another terminal of R2 is connected to the ground 18, and the output of PFC controller 20 is connected to the gate of MOSFET Q1. Another terminal of resistor R1 is connected to one terminal of capacitor C2 and the input terminal of the control circuit 22, while the output terminal of the control circuit 22 is connected to the third terminal 3 of switching transistor (S1). The cathode of diode D1 is connected to the positive terminal of electrolytic capacitor C1, the negative terminal of electrolytic capacitor C1 is connected to the ground 18, and the voltage of the electrolytic capacitor C1 is the output voltage Vo.

As for FIG. 5, the current signals of MOSFET Q1 are detected by resistor R2 then is sampled and filtered by resistor R1 and second capacitor C2 into voltage signal which then received by the control circuit 22 and output control signals to the third terminal 3 of switching resistor (S1) to control the switching action of S1. When the circuit is operated in heavy load condition, the control circuit 22 processes the voltage signals produced by resistor R1 and second capacitor C2, and output high level signal which triggers switching transistor to conduct, then capacitor Cx1 is worked as a filter capacitor. When the circuit is operated in light load condition, the control circuit processes the voltage signals produced by resistor R1 and second capacitor C2, and output low level signal which cause switching transistor to cut off, capacitor Cx1 is therefore bypassed and light load power factor is improved.

Figure 6:
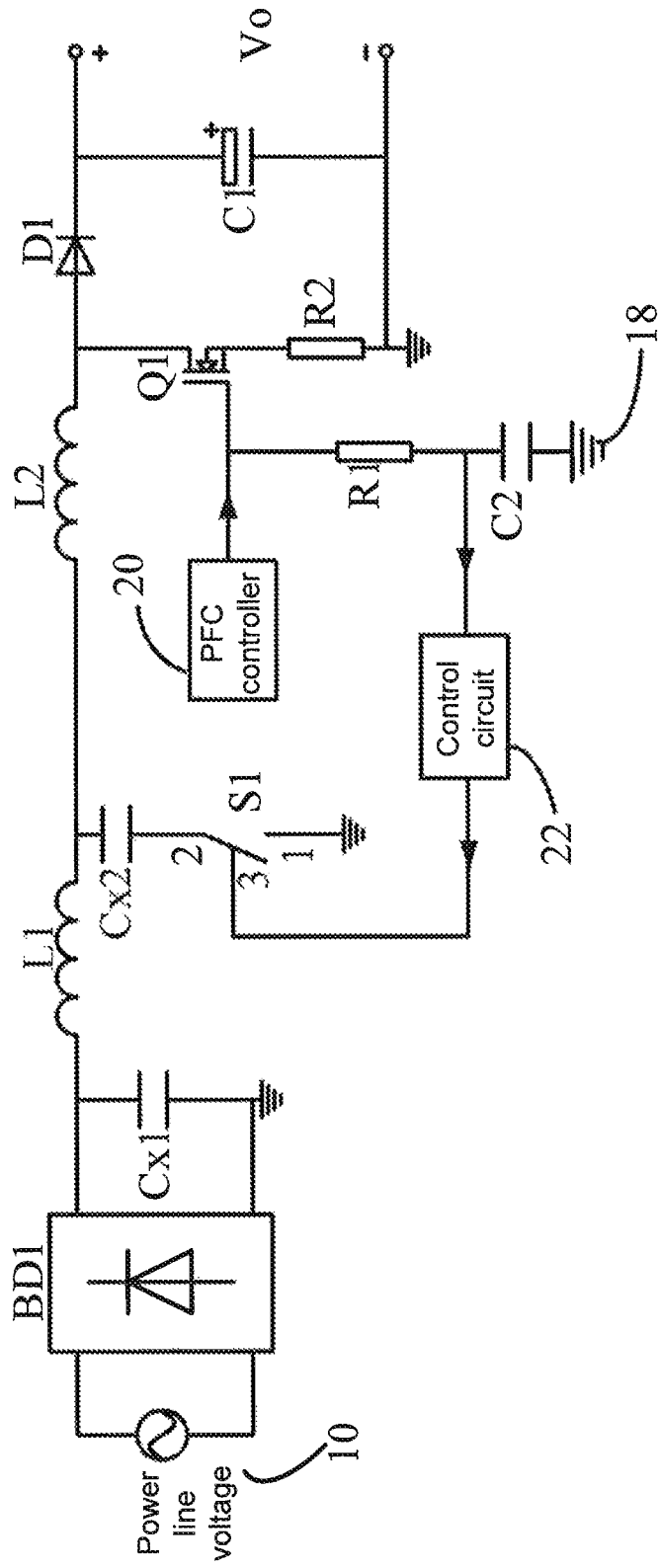
FIG. 6 is a schematic circuit of the first implementation which can improve light load power factor of power supply as applied scheme (2) of the present invention.

FIG. 6 is an exemplary implementation of a circuit which can improve light load power factor of power supply described in scheme (2). As illustrated, the power factor correction circuit 16 comprising an inductor L2, a MOSFET Q1, a diode D1, an electrolytic capacitor C1, a resistors R1 and R2, a second capacitor C2, and a PFC controller 20. The logic control and power drive circuit 14 together with the light load detecting circuit 12 are combined into the control circuit 22. Specifically, the power line voltage 10 is connected with the input terminal of rectifier bridge BD1, the output terminal of rectifier bridge BD1 is connected to Cx1, the positive output of rectifier bridge BD1 is connected to one terminal of inductor L1, the negative output of rectifier bridge BD1 is connected to the ground 18, the another terminal of inductor L1 is connected to one terminal of capacitor Cx2 and one terminal of inductor L2, and the another terminal of capacitor Cx2 is connected to the second terminal 2 of switching transistor (S1). The first terminal 1 of switching transistor 51 is connected to the ground 18, the another terminal of inductor L2 is connected with to drain of MOSFET Q1 and the anode of diode D1, the source of MOSFET Q1 is connected to one terminal of resistor R2, and the another terminal of R2 is connected to the ground 18. The output of PFC controller 2o is connected to the gate of MOSFET Q1 and one terminal of resistor R1, the another terminal of resistor R1 is connected to one terminal of second capacitor C2 and the input terminal of control circuit 22, and the output terminal of control circuit 22 is connected with the third terminal 3 of switching transistor (S1). The cathode of diode D1 is connected to the positive terminal of electrolytic capacitor C1, the negative terminal of electrolytic capacitor C1 is connected to the ground 18, and the voltage of the electrolytic capacitor C1 is the output voltage Vo.

As for FIG. 6, the signals driven by gate of MOSFET Q1 is sampled and filtered by resistor R1 and capacitor C2 into voltage signal, and then received by the control circuit 22 and output control signals to the third terminal 3 of switching resistor (S1) to control switching action of (S1). When the circuit is operated in heavy load condition, the control circuit 22 processes voltage signals produced by resistor R1 and second capacitor C2, and output high level signals which cause switching transistor to conduct, then capacitor Cx2 is worked as a filter capacitor. When the circuit is operated in a light load condition, the control circuit processes voltage signals produced by resistor R1 and capacitor C2, and output low level signal causing the switching transistor S1 to cut off, then capacitor Cx2 is bypassed, inductor L1 and inductor L2 are connected in series and worked as an energy inductor of the PFC circuit, light load power factor can then be improved.

Figure 7:
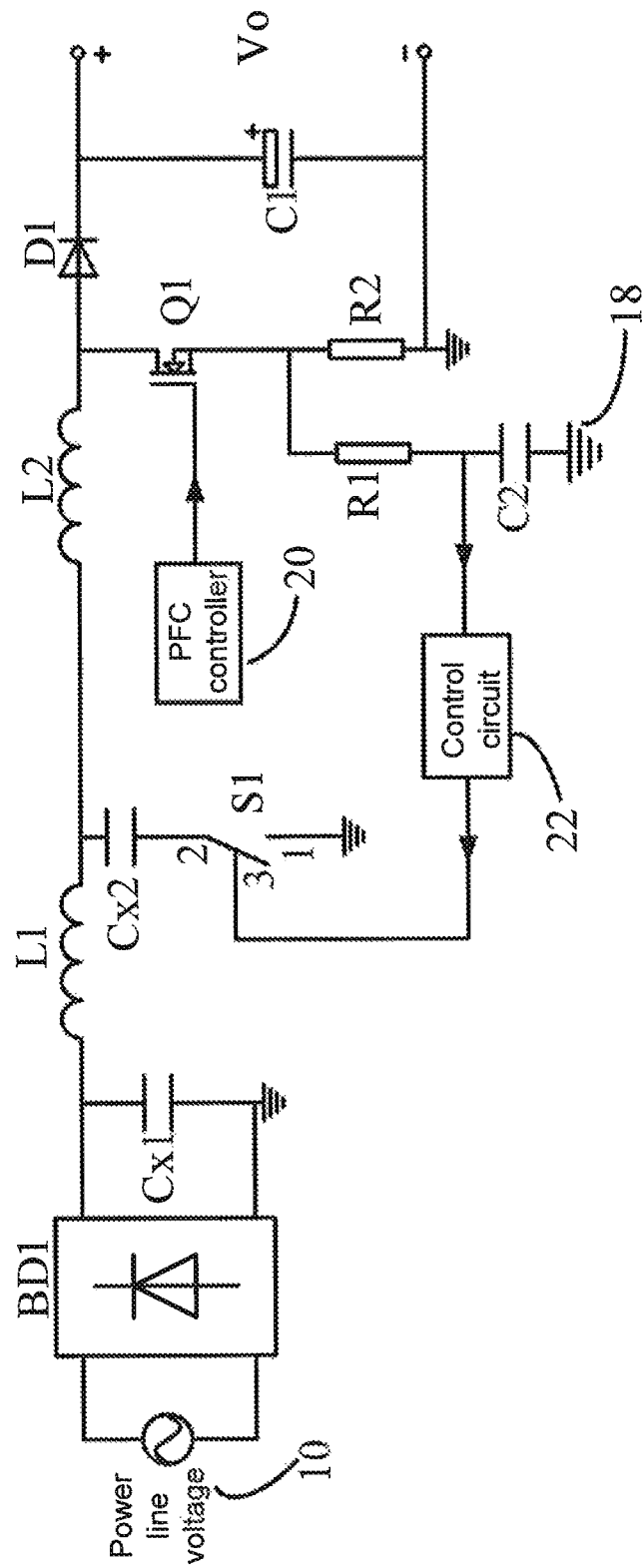
FIG. 7 is a schematic circuit of the second implementation which is able to improve light load power factor of power supply as in scheme (2) of the present invention.

FIG. 7 is another exemplary implementation of the circuit which can improve light load power factor of power supply as described in scheme (2). As illustrated, the power factor correction circuit 16 comprises an inductor L2, a MOSFET Q1, a diode D1, an electrolytic capacitor C1, resistors R1 and R2, a second capacitor C2 and a PFC controller 20. The logic control and power drive circuit 14 together with the light load detecting circuit 12 are combined into the control circuit 22. Specifically, the power line voltage 10 is connected to the input terminal of rectifier bridge BD1, the output terminal of rectifier bridge BD1 is connected to Cx1, the positive output of rectifier bridge BD1 is connected to one terminal of inductor L1, and the negative output of rectifier bridge BD1 is connected to the ground 18. The other terminal of capacitor Cx1 is connected to the ground 18, the another terminal of inductor L1 is connected to one terminal of capacitor Cx2 and one terminal of inductor L2, another terminal of capacitor Cx2 is connected to the second terminal 2 of switching transistor (S1), and the first terminal of switching transistor S1 is connected to the ground 18. Another terminal of inductor L2 is connected to the drain of MOSFET Q1 and the anode of diode D1, the source of MOSFET Q1 is connected to one terminal of resistor R2 and one terminal of resistor R1, and another terminal of R2 is connected to the ground 18. The output of PFC controller 20 is connected to the gate of MOSFET Q1, another terminal of resistor R1 is connected to one terminal of second capacitor C2 and the input terminal of control circuit 22, the output terminal of the control circuit 22 is connected to the third terminal 3 of switching transistor (S1), and the cathode of diode D1 is connected to the positive terminal of electrolytic capacitor C1. The negative terminal of electrolytic capacitor C1 is connected to the ground, and the voltage of the electrolytic capacitor C1 is the output voltage Vo.

As for FIG. 7, the current signals of MOSFET Q1 detected by resistor R2 is sampled and filtered by resistor R1 and second capacitor C2 into voltage signal, which will received by the control circuit 22 and output control signals to the third terminal 3 of switching resistor S1 to control the switching action of S1. When the circuit is operated in a heavy load condition, the control circuit 22 processes voltage signals produced by resistor R1 and capacitor C2, consequently output high level signals which will cause switching transistor to conduct, then capacitor Cx2 is worked as a filter capacitor. When the circuit is operated in a light load condition, the control circuit 22 processes voltage signals produced by resistor R1 and capacitor C2, which then output low level signals causing switching transistor to cut off, capacitor Cx2 is therefore bypassed. Inductor L1 and inductor L2 are connected in series and work as an energy inductor of PFC circuit 16, hence light load power factor can be improved.

Finally, it should be noted that those listed above are only the concrete of this invention. Clearly, the implementations of this invention are not limited to those cases above. It might have a variety of transform. All extended transformations which associated or deduced from the content of this invention by general and technical personals in this field should be considered the scope of protection and invention.

What is claimed is:

1. A circuit to improve the power factor of a power supply at light load, the circuit comprising:
   a rectifier bridge;
   a branch circuit in which a capacitor and a switching transistor are connected in series;
   a logic control and power drive circuit;
   a light load detecting circuit configured to output a control signal to the logic control and power drive circuit which controls the switching transistor to conduct when a heavy load is experienced and to cut off when a light load is experienced, in order to control the working status of the capacitor; and
   a power factor correction circuit;
   wherein input terminals of the rectifier bridge are connected with a power line voltage, while output terminals of the rectifier bridge are connected in parallel with the power factor correction circuit and the branch circuit;
   wherein one terminal of the capacitor and a first terminal of the switching transistor are connected with two out terminals of the rectifier bridge respectively, while the other terminal of the capacitor is connect with a second terminal of the switching transistor;
   wherein an output of the light load detecting circuit is connected with an input of the logic control and power drive circuit, and an output of the logic control and power drive circuit are connected with a third terminal of the switching transistor.

2. A circuit to improve the power factor of a power supply at light load, the circuit comprising:
   a rectifier bridge;
   a filter comprises a first capacitor, a second capacitor and an inductor;
   a logic control and power drive circuit;
   a switching transistor;
   a light load detecting circuit configured to output a control signal to the logic control and power drive circuit which controls the switching transistor to conduct when a heavy load is experienced and to cut off when a light load is experienced, in order to control the working status of the second capacitor; and
   a power factor correction circuit;
   wherein input terminals of the rectifier bridge are connected with a power line voltage, while a positive output of the rectifier bridge is connected with one terminal of the inductor and one terminal of the first capacitor; another terminal of the inductor is connected with one terminal of the second capacitor and a positive input terminal of the power factor correction circuit, while a negative input terminal of the power factor correction circuit is connected to ground; another terminal of the second capacitor is connected with a second terminal of the switching transistor, while a first terminal of the switching transistor is connected to the ground; an output terminal of the light load detecting circuit is connected with an input terminal of the logic control and power drive circuit, and an output of the logic control and power drive circuit is connected with a third terminal of the switching transistor.

\* \* \* \* \*